United States Patent
Kam (10) Patent No.: US 11,964,645 B2
(45) Date of Patent: Apr. 23, 2024

(54) VALVE ASSEMBLY FOR BRAKE APPARATUS OF VEHICLE AND MANUFACTURING METHOD THEREFOR

(71) Applicant: HYUNDAI MOBIS CO., LTD., Seoul (KR)

(72) Inventor: Moo Chul Kam, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 108 days.

(21) Appl. No.: 17/493,145

(22) Filed: Oct. 4, 2021

(65) Prior Publication Data

US 2023/0015827 A1    Jan. 19, 2023

(30) Foreign Application Priority Data

Jul. 9, 2021    (KR) .................. 10-2021-0090396

(51) Int. Cl.
| | |
|---|---|
| *B60T 15/02* | (2006.01) |
| *F16K 27/02* | (2006.01) |
| *F16K 31/06* | (2006.01) |

(52) U.S. Cl.
CPC .......... *B60T 15/028* (2013.01); *F16K 27/029* (2013.01); *F16K 31/0675* (2013.01)

(58) Field of Classification Search
CPC ........ B60T 8/363; B60T 8/368; B60T 13/686; B60T 15/028; F16K 27/029;
(Continued)

(56) References Cited

U.S. PATENT DOCUMENTS

| | | | | |
|---|---|---|---|---|
| 4,044,322 A | * | 8/1977 | Brown .................. | H01H 50/14 335/133 |
| 4,972,165 A | * | 11/1990 | Kirma .................. | H01H 50/14 335/83 |

(Continued)

FOREIGN PATENT DOCUMENTS

| | | |
|---|---|---|
| DE | 10036701 A1 | 2/2001 |
| DE | 102016201003 A1 | 7/2016 |

(Continued)

OTHER PUBLICATIONS

Office Action dated Feb. 18, 2022 issued in corresponding German Application No. 102021126532.0.

(Continued)

*Primary Examiner* — Matthew W Jellett
(74) *Attorney, Agent, or Firm* — NovoTechIP International PLLC (57) ABSTRACT

A valve assembly for a vehicle brake apparatus is disclosed, including a solenoid valve, a pump housing having a bore accommodating the solenoid valve at least partially, a coil for applying a magnetic force to the solenoid valve, a circuit board configured to generate a signal for controlling opening and closing of the solenoid valve, a circuit board housing for accommodating the circuit board, a bobbin at least partially disposed inside the coil, a pin coupled to the bobbin and configured to supply an electric current to the coil, and a coil case at least partially disposed radially outwardly of the coil. Here, the bobbin is coupled with a compression unit that is in external contact with one surface of the circuit board and configured to compress the bobbin and the coil case toward the pump housing.

10 Claims, 6 Drawing Sheets

(58) Field of Classification Search
CPC .. F16K 31/0655; F16K 31/0675; H01F 7/126; H01F 7/127; H01F 2007/062
See application file for complete search history.

(56) References Cited

U.S. PATENT DOCUMENTS

| | | | | |
|---|---|---|---|---|
| 5,407,131 | A * | 4/1995 | Maley | F02M 59/466 239/90 |
| 5,474,234 | A * | 12/1995 | Maley | F02M 59/466 239/88 |
| 5,774,036 | A * | 6/1998 | Hrytzak | H01F 5/02 336/185 |
| 6,412,754 | B1 * | 7/2002 | Ogino | F15B 13/0814 303/119.3 |
| 6,633,216 | B2 * | 10/2003 | Lewin | H01F 7/126 335/278 |
| 8,534,641 | B2 * | 9/2013 | Schalowski | H05K 3/32 439/700 |
| 9,267,610 | B2 * | 2/2016 | Ogawa | F16K 31/046 |
| 11,167,740 | B2 * | 11/2021 | Komaba | B60T 15/028 |
| 2002/0111730 | A1 * | 8/2002 | Thorum | F16H 61/0009 701/51 |
| 2023/0015827 | A1 * | 1/2023 | Kam | H01F 7/126 |

FOREIGN PATENT DOCUMENTS

| | | |
|---|---|---|
| JP | 2018049859 A | 3/2018 |
| KR | 1020030022550 A | 3/2003 |
| KR | 1020140054508 A | 5/2014 |

OTHER PUBLICATIONS

Korean Office Action dated Dec. 16, 2022 issued in corresponding Korean Application No. 10-2021-0090396.
Office Action dated Jun. 26, 2023 in corresponding Korean Patent Application No. 10-2021-0090396.

* cited by examiner

VALVE ASSEMBLY FOR BRAKE APPARATUS OF VEHICLE AND MANUFACTURING METHOD THEREFOR

CROSS-REFERENCE TO RELATED APPLICATIONS

This application is based on, and claims priority from, Korean Patent Application Number 10-2021-0090396, filed Jul. 9, 2021, the disclosure of which is incorporated by reference herein in its entirety.

BACKGROUND OF THE INVENTION

1. Field of the Invention

The present disclosure relates to a valve assembly for a brake apparatus of a vehicle. More particularly, the present disclosure relates to valve assembly controlled with a circuit board for a vehicle brake apparatus.

2. Discussion of Related Art

The statements in this section merely provide background information related to the present disclosure and do not necessarily constitute prior art.

Recent vehicle brake technologies control and drive a brake apparatus by using an electric and electronic mechanism. For example, an anti-lock brake system (ABS) of a vehicle employs an electronic control unit (ECU) for controlling a plurality of solenoid valves on a hydraulic circuit included in the brake apparatus.

Implementation of such a function as ABS needs to install a plurality of solenoid valves in the brake apparatus. The electronic control unit is configured to apply an electric current to a coil wound around the outer circumferential surface of the solenoid valve. An electric current applied to the coil forms a magnetic field internally of the coil winding, generating magnetic force to operate a mechanical member in the solenoid valve and thereby open and close the solenoid valve.

Such a solenoid valve is preferably configured to generate a uniform electromagnetic force to act on each of the plurality of solenoid valves. Additionally, a solenoid valve is preferably configured so that heat generated from the coil is smoothly discharged to prevent thermal damage to the valve assembly, such as deformation of a bobbin.

Figure 1A:
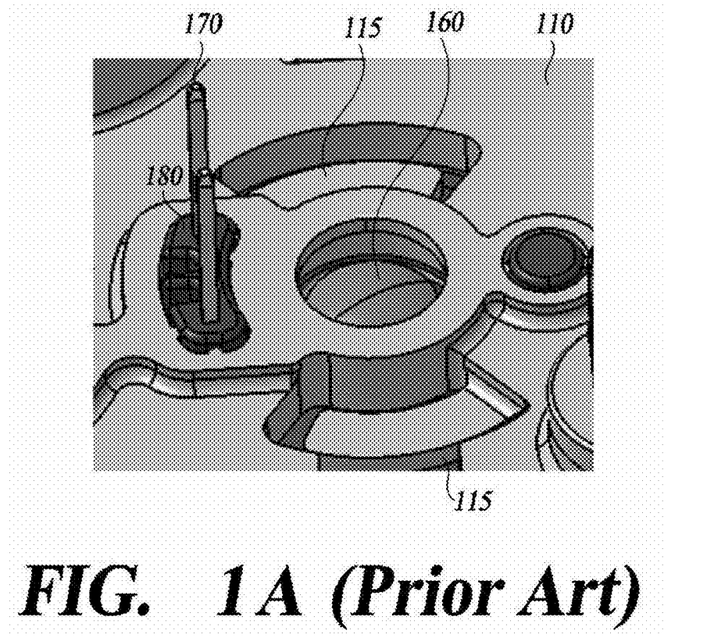
FIGS. 1A and 1B illustrate a conventional valve assembly for a vehicle brake.
Figure 1B:
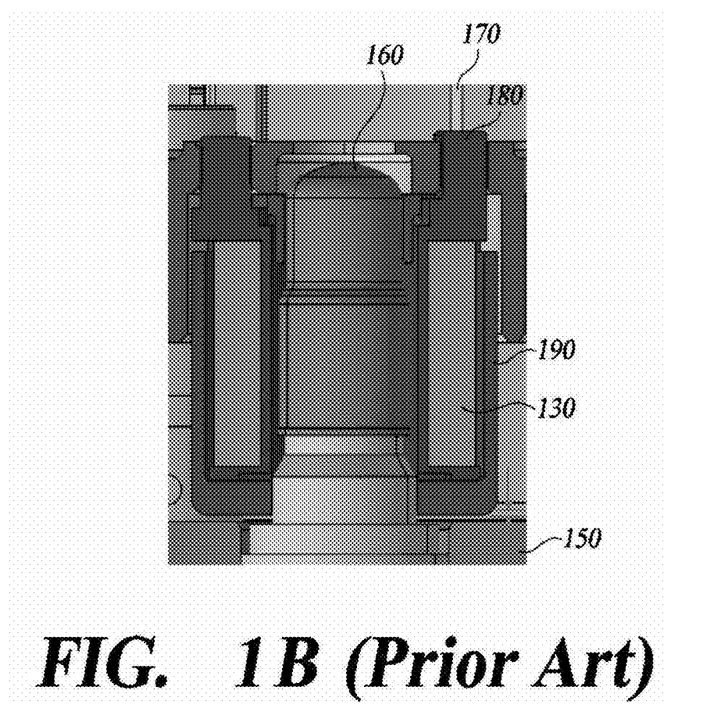

In FIGS. 1A and 1B illustrating a conventional valve assembly for a vehicle brake, a coil 130 when positioned in proximal contact with the surface of a pump housing 150 may generate electromagnetic force at a constant position with heat generated from the coil 130 being conducted to the pump housing 150 to prevent thermal damage to the valve assembly.

FIGS. 1A and 1B illustrate a conventional valve assembly for a vehicle brake.

As shown in FIGS. 1A and 1B, to provide this function, the conventional valve assembly takes tension protrusions 115 of a circuit board housing 110 to push a coil case 190 down to touch the pump housing 150.

However, the tension protrusion 115 of the circuit board housing 110 is subject to the dimensional error and rigidity error occurring in the production process and susceptible to having insufficient tension force to adhere the coil case 190 to the pump housing 150. Such occasions inappropriately alter the position where the electromagnetic force is generated, which blocks the heat generated in the coil 130 from being transferred to the pump housing 150.

BRIEF SUMMARY OF THE INVENTION

According to at least one embodiment, the present disclosure provides a method including a valve assembly for a vehicle brake apparatus, including a solenoid valve, a pump housing, a coil, a circuit board, a bobbin, a pin, and a coil case. The pump housing has a bore accommodating the solenoid valve at least partially. The coil is configured to apply a magnetic force to the solenoid valve. The circuit board is configured to generate a signal for controlling the opening and closing of the solenoid valve. The circuit board housing is configured to accommodate the circuit board. The bobbin is at least partially disposed within the coil. The pin is coupled to the bobbin and configured to supply an electric current to the coil. The coil case is at least partially disposed radially outwardly of the coil. Here, the bobbin is coupled with a compression unit that is in contact with or circumscribe about one surface of the circuit board and configured to compress the bobbin and the coil case toward the pump housing.

According to another embodiment, the present disclosure provides a method of manufacturing a valve assembly for a vehicle brake apparatus, the valve assembly having a pump housing accommodating a solenoid valve at least partially, a coil for applying a magnetic force to the solenoid valve, a circuit board for generating a signal for controlling opening and closing of the solenoid valve, a bobbin at least partially disposed within the coil and coupled with a compression unit for compressing the bobbin and the coil case toward the pump housing, and a coil case at least partially disposed radially outwardly of the coil, the method including assembling the coil, the bobbin, the coil case, and the circuit board housing to form a housing-coil assembly, assembling the compression unit to the housing-coil assembly, contacting the circuit board to the compression unit, and accommodating the solenoid valve within the bobbin.

| REFERENCE NUMERALS | |
| --- | --- |
| 210: solenoid valve | 220: pump housing |
| 221: bore | 230: coil |
| 240: circuit board | 241: coil contact portion |

-continued

| REFERENCE NUMERALS | |
|---|---|
| 250: circuit board housing | 260: bobbin |
| 270: compression unit | 271: base portion |
| 273: elastic deformation part | 273_a: groove portion |
| 273_b: bending portion | 275: pin |
| 280: protrusion | 290: coil case |

DETAILED DESCRIPTION OF THE INVENTION

Accordingly, the present disclosure is devised to improve the above deficiencies by providing a valve assembly for a vehicle brake apparatus wherein a coil bobbin is coupled with a compression unit in an arrangement to be depressed by a relevant circuit board, thereby stabilizing the position of the coil-generated electromagnetic force while allowing generated heat from the coil to be smoothly transferred to a pump housing.

The issues to be solved by the present disclosure are not limited to those mentioned above, and other unmentioned issues to be resolved by the present disclosure will be clearly understood by those skilled in the art from the following description.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

In describing some embodiments of the present disclosure, terms such as longitudinal direction, horizontal direction, upper one, lower one, and lower surfaces are written based on a solenoid valve 210 of the drawings, respectively, and they refer to the longitudinal direction, horizontal direction, upper one, lower one, and lower surfaces of the solenoid valve 210.

As shown in FIGS. 2 to 5B, the valve assembly for a vehicle brake according to at least one embodiment of the present disclosure includes all or some of a pump housing 220, a coil 230, a circuit board 240, a circuit board housing 250, a bobbin 260, a pin 275, and a protrusion 280.

The solenoid valve 210 is a valve that opens and closes depending on whether a current is applied. When a current flows in the coil 230 surrounding the outer peripheral surface of the solenoid valve 210, a magnetic force is formed within the coil 230, that is, in the space where the solenoid valve 210 is disposed, and the magnetic force moves a magnetic body within the solenoid valve 210. The solenoid valve 210 is opened or closed according to the movement of the magnetic body therein. A plurality of solenoid valves 210 is disposed in the hydraulic circuit through which working fluid is transferred from a reservoir storing the working fluid to the cylinder of vehicle wheel brakes. Each solenoid valve 210 in the hydraulic circuit may be configured to control the direction in which the working fluid flows and/or the flow rate of the working fluid. The opening and closing operations of the plurality of solenoid valves 210 can control the vehicle brake.

Figure 2:
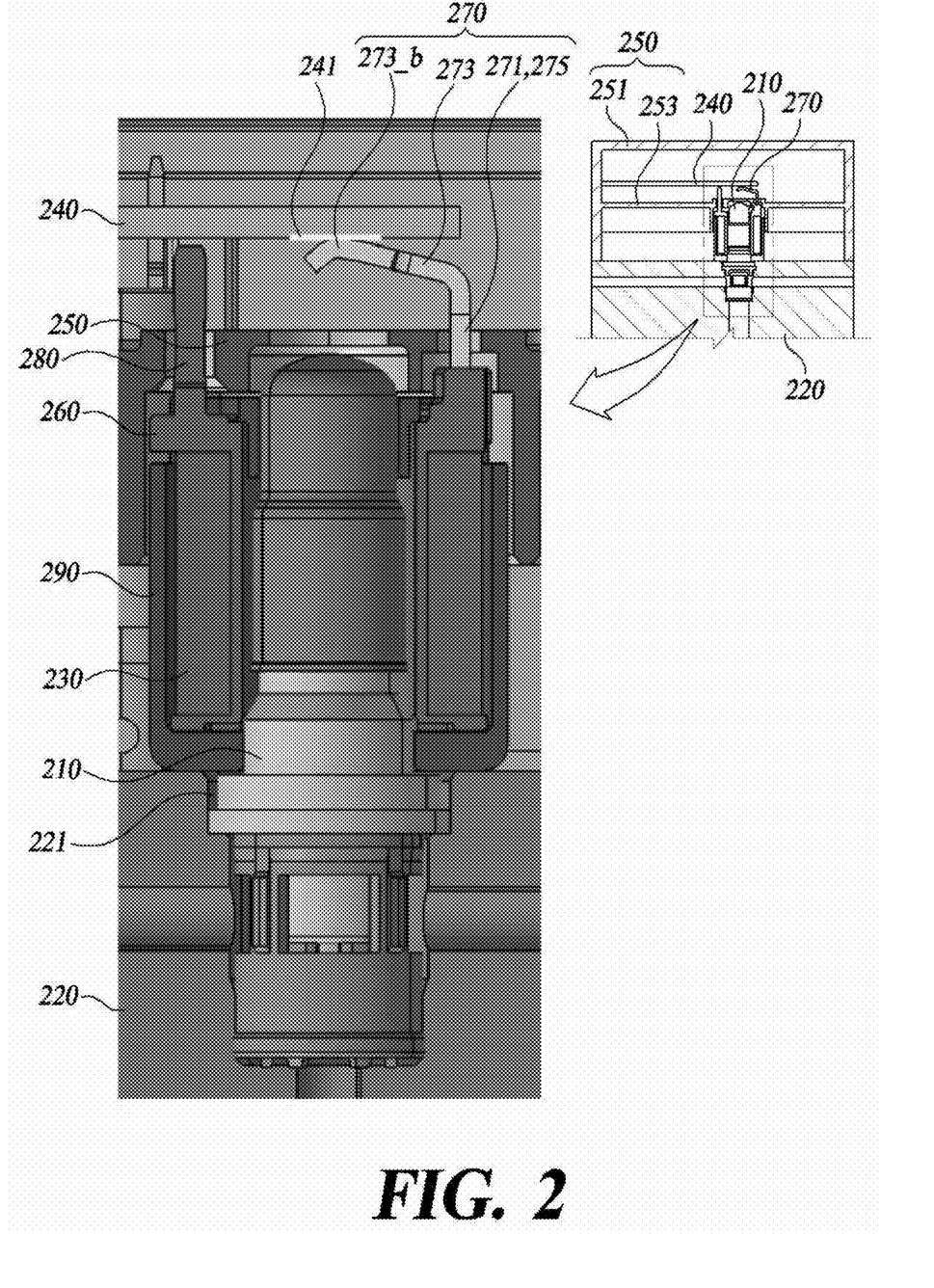
FIG. 2 is a cross-sectional view of a valve assembly for a vehicle brake, according to at least one embodiment of the present disclosure.

As shown in FIG. 2, the pump housing 220 is formed with a bore 221 in which the solenoid valve 210 is at least partially accommodated. Some components of the solenoid valve 210 may be press-fitted into the bore 221 to make an insertion engagement. A motor may be mounted on the other side of the pump housing 220 opposite to the side on which the solenoid valve 210 is installed. The motor generates and supplies the hydraulic pressure required to drive the vehicle brakes to the hydraulic circuit. The circuit board 240 is disposed on the opposite side of the pump housing 220 with respect to the solenoid valve 210.

The coil 230 applies a magnetic force to the solenoid valve 210. When a current flows in the coil 230, a magnetic field is formed in the coil 230 by Faraday's Law of Electromagnetic Induction. The formed magnetic field applies a magnetic force to the magnetic body within the solenoid valve 210. The magnetic body applied with the magnetic force moves to open and close the coil 230. The coil 230 may have, but is not limited to, a circular formation that surrounds the solenoid valve 210, and the coil 230 can have any other cross-sectional shapes such as an ellipse or a square as long as it surrounds the solenoid valve 210. The coil 230 may surround the outside of the bobbin 260. The outer surface of the bobbin 260 conforms to the shape in which the coil 230 is wound.

The circuit board 240 generates a signal for controlling the opening and closing of the solenoid valve 210. Specifically, the circuit board 240 controls the opening and closing of the solenoid valve 210 based on the received desired brake pressure. The required braking pressure may be a driver's pedal stroke determined by using a pedal simulator. Here, the required braking pressure may be expressed as, but is not limited to, an electrical signal, and may be a hydraulic pressure formed by a booster that boosts the driver's pedal pressure. In another embodiment, the required braking pressure may be a value calculated by at least one module included in an autonomous vehicle, and the type of the required braking pressure is not limited to the illustrated embodiment of the present disclosure.

The circuit board 240 applies an electric current based on the required braking pressure to the pin 275 (not shown). Upon receiving the current supplied using the pin 275, the coil 230 forms a magnetic field therein. Thereafter, the mechanism for opening and closing the solenoid valve 210 is the same as described above. The circuit board 240 may be printed with a circuit for controlling a vehicle brake apparatus.

The circuit board housing 250 accommodates the circuit board 240. The circuit board housing 250 may be formed as a cover over the pump housing 220. The circuit board housing 250 according to at least one embodiment of the present disclosure includes not only a cover portion (not shown) formed to cover the pump housing 220, but also a planar portion (not shown) configured to abut the protrusion and restraint the degree of freedom of the bobbin 260. The circuit board housing 250 may have a box shape including the cover portion 251 and the planar portion 253. The planar portion is in contact at least partially with a coil case 290 or the bobbin 260 to be described below. The circuit board housing 250 according to at least one embodiment of the present disclosure may be made free of the typical tension protrusions 110 formed in the conventional circuit board housing. Requiring no tension protrusions 110 to be formed on the circuit board housing, the production cost of the valve assembly can be reduced.

The bobbin 260 is disposed at least partially within the coil 230. The bobbin 260 is configured so that the coil 230 can be wound along the outer circumferential surface of the bobbin 260. The bobbin 260 may be formed to have a hollow for accommodating some of the solenoid valve 210. The solenoid valve 210 is disposed in a magnetic field generated by the current flowing in the coil 230. The solenoid valve 210 is responsive to the magnetic force received for controlling the opening and closing of the hydraulic flow path. The bobbin 260 may be injection molded by using a plastic material.

The pin 275 is configured to couple with the bobbin 260 to supply current to the coil 230. A plurality of pin 275s, for example, two pin 275s may be included. Each pin 275 is in contact with the circuit board 240 and the bobbin 260, and it transmits an electrical signal of the circuit board 240 to the coil 230.

At least some of the coil case 290 is disposed radially outwardly of the coil 230. Since the horizontal cross-section of the coil 230 is not limited to a circular shape, radially outward means the horizontally outer side of the horizontal cross-section of the coil 230 regardless of what type of horizontal cross-section the coil 230 has. The coil case 290 surrounds at least some of the coil 230 surrounding the bobbin 260. The outer surface of the coil case 290 is at least partially in contact with the pump housing 220 and prevents the pump housing 220 from moving more than a predetermined displacement in the horizontal direction.

Coupled to the bobbin 260 of the present disclosure is a compression unit 270 that is in contact with or circumscribe about one surface of the circuit board 240 and compresses the bobbin 260 and the coil case 290 toward the pump housing 220. The compression unit 270 is in contact with the circuit board 240 to receive an electric current therefrom. The compression unit 270 according to at least one embodiment of the present disclosure is in contact with the circuit board 240 but does not penetrate the same. As the bobbin 260 and the coil case 290 are compressed to the pump housing 220 by the compression unit 270, heat that is generated while a current flows in the coil 230 may be thermally conducted to the pump housing 220. The compression unit 270 may keep the coil case 290, the bobbin 260, and the coil 230 of the brake valve assembly at a constant position. This reduces variations in control performance of the brake valve assembly between different vehicles.

As shown in FIG. 2, the compression unit 270 according to at least one embodiment is coupled to the bobbin 260, and at least some of the bottom surface of the coil case 290 is in contact with the pump housing 220. The bobbin 260 contacts and presses the coil case 290 toward the pump housing 220. The lower surface of the coil case 290 is bent toward the center of the solenoid valve 210 so that the outer side of the lower surface is in contact with the pump housing 220 and the inner side thereof is in contact with the coil case 290. The bobbin 260 and the coil 230 are disposed above the bent lower surface of the coil case 290. This enables the compression unit 270 coupled to the bobbin 260 of the coil 230 to be in contact with one surface of the circuit board 240 while simultaneously compressing the bobbin 260 and the coil case 290 toward the pump housing 220. An alternative configuration is envisioned wherein the compression unit 270 is formed in the coil case 290 and the lower surface of the bobbin 260 is bent in the radial direction to support that coil case. The alternative configuration may still have the pin 275s coupled to the inner or outer surfaces of the compression unit 270.pin 275

The compression unit 270 according to at least one embodiment of the present disclosure is in contact with or circumscribe about one surface of the circuit board 240 and elastically deformed. The restoring force of the elastically deformed compression unit 270 acts as a force for pressing the bobbin 260 and the coil case 290 toward the pump housing 220.

The pin 275 is coupled to the inner or outer surfaces of the compression unit 270 according to at least one embodiment of the present disclosure. As described above, the pin 275 contacts the circuit board 240 and transmits an electrical signal of the circuit board 240 to the coil 230. A pin 275 may be coupled to an inner or outer surface of the compression unit 270 in contact with the circuit board 240 so that the pin 275 may transmit an electrical signal from the circuit board 240 to the coil 230. When the pin 275 is disposed within the compression unit 270, the inner surface of the compression unit 270 contacts the pin 275, and the compression unit 270 is formed of a conductor. In this case, multiples of the compression unit 270 may be provided as many as the number of pin 275s, or a plurality of pin 275s may be provided in one compression unit 270. However, the present disclosure is not limited thereto, and the compression unit 270 and the pin 275 may be installed separately, or a portion of the compression unit 270 itself may serve as a pin 275. For example, a base portion 271 that is a part of the compression portion 270 may serve as a pin 275.

Figure 3:
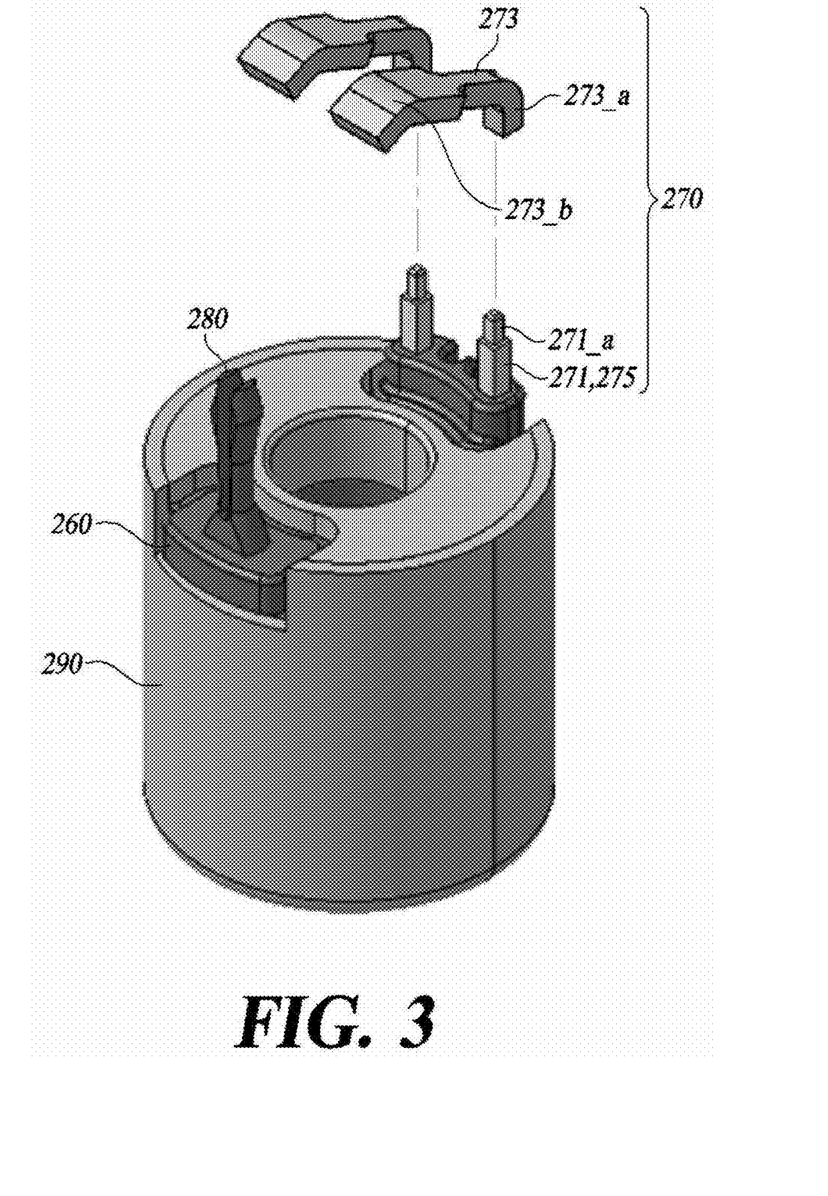
FIG. 3 is a perspective view of the valve assembly for a vehicle brake according to at least one embodiment of the present disclosure.
Figure 4:
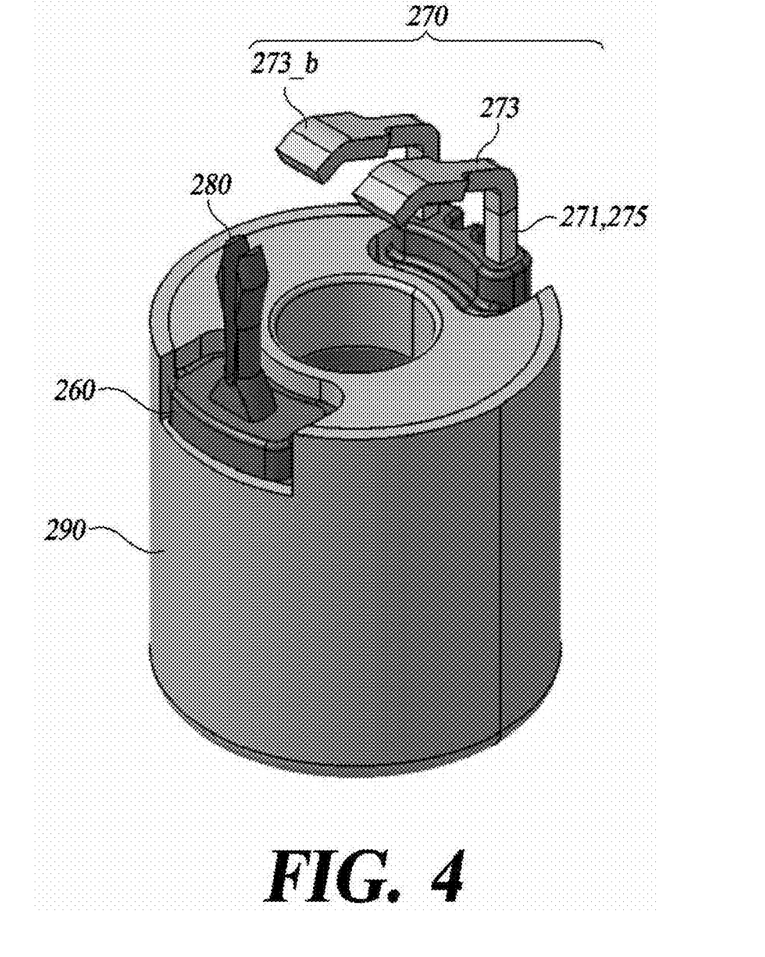
FIG. 4 is a perspective view of a valve assembly for a vehicle brake, according to another embodiment of the present disclosure.

As shown in FIGS. 2 to 4, the compression portion 270 according to at least one embodiment includes a base portion 271 and an elastic deformation part 273. The base 271 extends in the same direction as the longitudinal direction of the solenoid valve 210 and has one end that is in contact with the bobbin 260. The elastic deformation part 273 is bent and extended from the base 271 and is elastically deformed while in contact with the circuit board 240. The number of base portions 271 may correspond to the number of compression portions 270. The pin 275 may be coupled to the inside or outside of the base 271. The base 271 may be press-fitted with the pin 275 to fix the pin 275. However, this is not the only fastening method. Alternatively, the base 271 itself may serve as a pin 275.

As shown in FIG. 3, the elastic deformation part 273 according to at least one embodiment is produced or formed separately from the base portion 271 and is assembled thereto. For example, the base 271 may be terminally formed with a coupling portion having a step portion 271_a facing toward the elastic deformation part 273, and the elastic deformation part 273 may be terminally formed with a groove portion 273_a facing toward the base 271 and conforming to the base coupling portion. On the contrary, the elastic deformation part 273 may be terminally formed with a coupling portion having a step portion 271_a, facing toward the base 271, and the base 271 may be terminally formed with a groove portion 273_a, facing toward the elastic deformation part 273 and conforming to the step of the coupling portion thereof. However, the present disclosure is not limited to the above assembly scheme or assembly method. During assembly, the elastic deformation part 273 may be brought to pass the coil case 290 and/or the circuit board housing 250 from the inside to the outside thereof, when the elastic deformation part 273 may collide with the inside of the coil case 290 and/or the circuit board housing 250, increasing the level of difficulty of the assembling process. The base portion 271 formed to extend in the same longitudinal direction as the solenoid valve 210 may be assembled with the coil case 290 and/or the control circuit housing unit, then the elastic deformation part 273 may be assembled to the base portion 271.

As shown in FIG. 4, the elastic deformation parts 273 according to another embodiment are integrally produced or formed with the base portions 271.

The elastic deformation part 273 according to at least one embodiment is formed midway with a bending portion, 273_b. FIGS. 2 to 4 show that one bending portion 273_b is formed midway on the elastic deformation part 273, but the present disclosure is not limited thereto. The bending portion 273_b may be formed at a plurality of positions instead of one in the elastic deformation part 273. At least some of the bending portion 273_b may have a curved shape. The radius of curvature of the bending portion 273_b is not limited. This allows the elastic deformation part 273 to be smoothly pressed against the circuit board 240 and deformed while preventing damage to the contact surfaces between the elastic deformation part 273 and the circuit board 240.

Figure 5A:
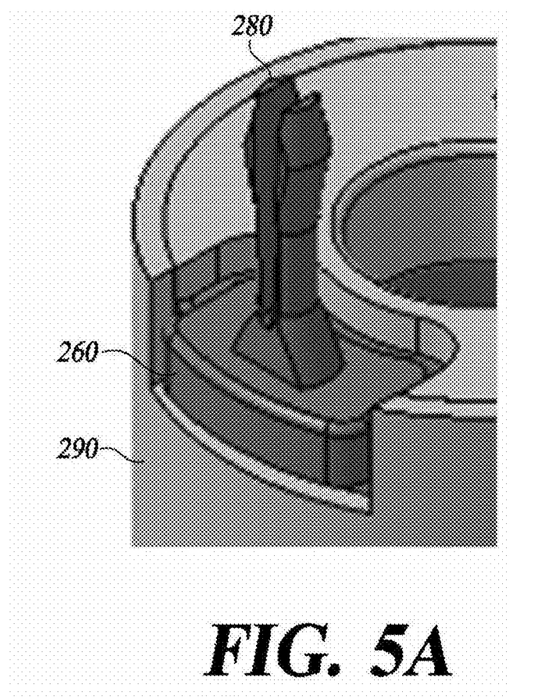
FIGS. 5A and 5B are perspective views illustrating a protrusion according to at least one embodiment of the present disclosure.
Figure 5B:
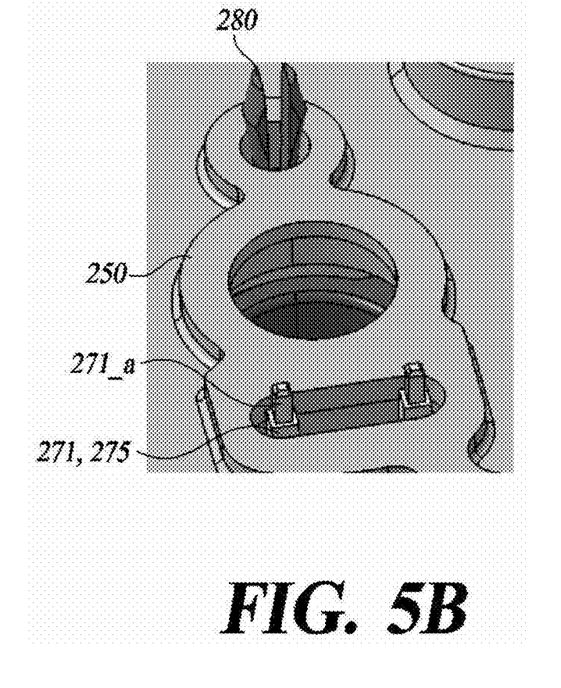

The bobbin 260 according to at least one embodiment is formed with a protrusion 280 for restraining a vertical movement of the bobbin 260 within a predetermined displacement. The protrusion 280 is formed on the bobbin 260 and passes through the hollow formed in the coil case 290 and/or the circuit board housing 250. The protrusion 280 prevents the bobbin 260 from being displaced upward or downward by a predetermined displacement or more before final assembly.

The protrusion 280 according to at least one embodiment is formed to be elastically deformed by being pressed against the circuit board housing 250. For example, the protrusion 280 may be made in the form of tongs with space therebetween increasing upwardly. However, the present disclosure is not limited thereto and includes any structure or material for restraining a vertical movement of the bobbin 260 within a predetermined displacement. With the above structure, the coil 230 is not restrained in the horizontal direction until the assembly is completed, which allows the coil 230 and the bobbin 260 to move as a whole to align them with the position of the solenoid valve 210 into a concentric arrangement between the solenoid valve 210, the coil 230, and the bobbin 260. When the assembly is completed, the bobbin 260 and the coil case 290 are compressed toward the pump housing 220 by the compression unit 270.

As shown in FIG. 2, the outer surface of the circuit board 240 in contact with the compression unit 270 is formed with a coil contact portion 241. The coil contact portion 241 may be a coil-contact pad or the circuit board 240 as plated with a metal having good conductivity to prevent damage to the contact portion between the compression portion 270 and the circuit board 240.

Figure 6:
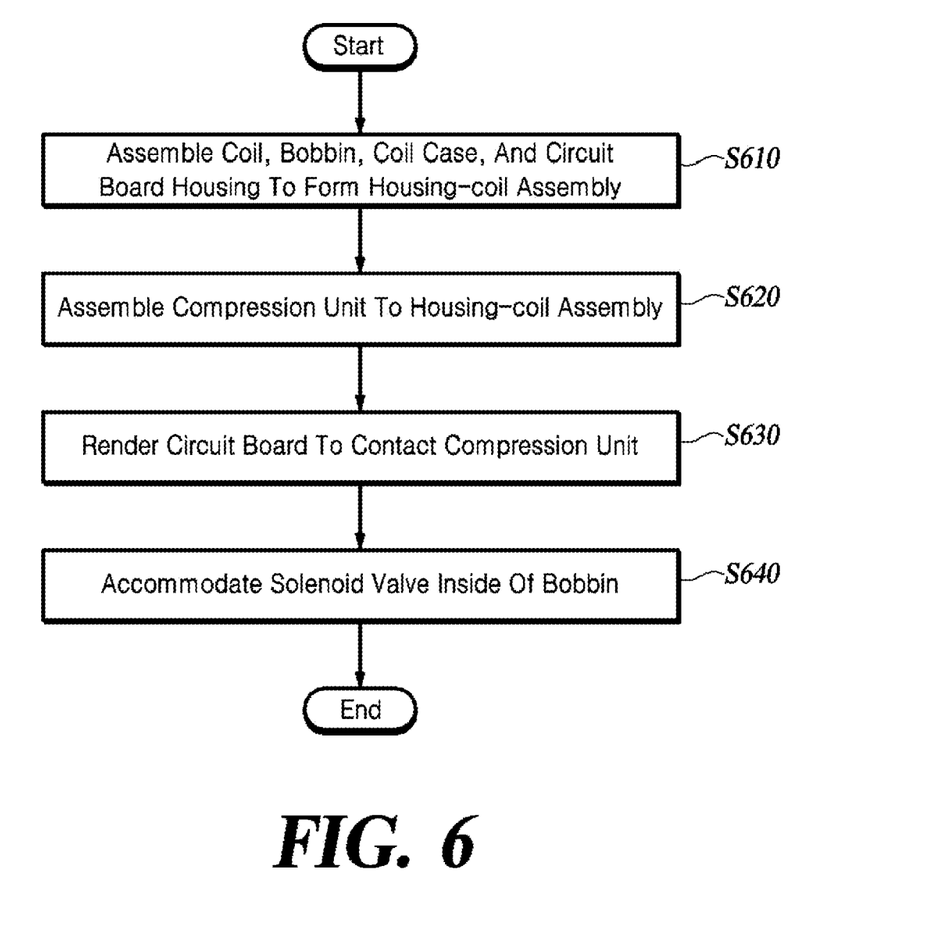
FIG. 6 is a block diagram of a method of manufacturing a valve assembly for a vehicle brake according to at least one embodiment of the present disclosure.

A method of manufacturing a valve assembly for a vehicle brake according to at least one embodiment of the present disclosure will be described referring to FIG. 6.

The coil 230, bobbin 260, coil case 290, and circuit board housing 250 are assembled to form a housing-coil assembly (S610). In Step S610, the compression unit 270 bent and extending from the bobbin 260 is not pre-assembled. This is to prevent the compression unit 270 from colliding with the coil case 290 and/or the circuit board housing 250.

The compression unit 270 is assembled to the housing-coil assembly (S620). As shown in FIGS. 3 and 6, Step S620 that is performed after Step S610 saves the compression unit 270 from colliding with the coil case 290 and/or the circuit board housing 250.

The circuit board 240 is brought to be in contact the compression unit 270 (S630). establishing a contact between the circuit board 240 and the compression unit 270 in Step S630 does not mean a one-way process in which the compression unit 270 stays still and the circuit board 240 is moved to make contact. For example, Step S630 equally employs a process in which the circuit board 240 is stationary and the compression unit 270 is moved to make contact.

The method of manufacturing the valve assembly may further include a step of assembling the protrusion 280 for restraining a movement of the bobbin 260 within a predetermined displacement with the bobbin 260. This final step performed can facilitate the valve assembling process.

As described above, the valve assembly for the vehicle brake according to the present disclosure provides a coil bobbin coupled with a compression unit in an arrangement to be depressed by a relevant circuit board, thereby stabilizing the position of the coil-generated electromagnetic force while allowing generated heat from the coil to be smoothly transferred to a pump housing.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A valve assembly for a vehicle brake apparatus, comprising:
   a solenoid valve;
   a pump housing having a bore configured to accommodate at least a portion of the solenoid valve;
   a coil configured to selectively generate a magnetic force to move the solenoid valve;
   a circuit board configured to selectively output an electric current;
   a circuit board housing configured to accommodate the circuit board;
   a bobbin at least partially disposed within and in electrical contact with the coil;
   a pin coupled to and in electrical contact with a top portion of the bobbin;
   a protrusion extending upwardly from the top portion of the bobbin and through the circuit board housing and configured to be elastically deformed when pressed toward the circuit board housing, wherein the pin and the protrusion are respectively disposed at radially opposite portions of the top portion of the bobbin;
   a coil case at least partially covering an outer surface of the coil; and
   an elastically deformable compression unit in contact with and extending between the circuit board and the pin and configured to transmit the electric current from the circuit board to the pin and compress the bobbin and the coil case toward the pump housing,
   wherein the electrical current output from the circuit board is applied to the coil through the compression unit, pin, and bobbin.

2. The valve assembly of claim 1, wherein the compression unit has an inner or outer surface coupled with the pin.

3. The valve assembly of claim 1, wherein:
the coil case has a lower surface that at least partially abuts the pump housing, and
the bobbin is biased by the compression unit to contact and press the coil case toward the pump housing.

4. The valve assembly of claim 1, wherein the compression unit comprises:
a base portion that is positioned in parallel with a longitudinal direction of the solenoid valve and has an end in contact with the bobbin; and
an elastic deformation part that is bent, extending from the base portion and in contact with the circuit board.

5. The valve assembly of claim 4, wherein the elastic deformation part has at least one bending portion at a middle portion thereof.

6. The valve assembly of claim 4, wherein the elastic deformation part is produced separately from the base portion and conjoined with the base portion.

7. The valve assembly of claim 4, wherein the elastic deformation part and the base portion are produced integrally.

8. The valve assembly of claim 1, wherein the protrusion is configured to elastically deform when pressed against the circuit board housing.

9. The valve assembly of claim 1, further comprising a coil contact portion disposed on a surface of the circuit board that is in contact with the compression unit.

10. A valve assembly comprising:
a pump housing having a bore;
a solenoid valve having a portion disposed at the bore of the pump housing;
a circuit board configured to selectively output an electric current;
a bobbin;
a coil wrapped around and in electrical contact with the bobbin and configured to, when applied with the electric current output from the circuit board, generate a magnetic force that moves the solenoid valve;
a pin coupled to and in electrical contact with a top portion of the bobbin;
a protrusion extending upwardly from the top portion of the bobbin and through the circuit board housing and configured to be elastically deformed when pressed toward the circuit board housing, wherein the pin and the protrusion are respectively disposed at radially opposite portions of the top portion of the bobbin; and
an elastically deformable unit in contact with and extending between the circuit board and the pin and configured to (1) transmit the electric current output from the circuit board to the pin and (2) press the bobbin toward the pump housing,
wherein the electrical current output from the circuit board is applied to the coil through the compression unit, pin and bobbin.

* * * * *